US006893762B2

(12) United States Patent
Sarkar et al.

(10) Patent No.: US 6,893,762 B2
(45) Date of Patent: May 17, 2005

(54) METAL-SUPPORTED TUBULAR MICRO-FUEL CELL

(75) Inventors: Partho Sarkar, Edmonton (CA); Lorne Johanson, Edmonton (CA); Hongsang Rho, Edmonton (CA)

(73) Assignee: Alberta Research Council, Inc., Edmonton (CA)

( * ) Notice: Subject to any disclaimer, the term of this patent is extended or adjusted under 35 U.S.C. 154(b) by 216 days.

(21) Appl. No.: 10/207,668

(22) Filed: Jul. 25, 2002

(65) Prior Publication Data
US 2003/0134171 A1 Jul. 17, 2003

Related U.S. Application Data

(63) Continuation-in-part of application No. 10/156,755, filed on May 23, 2002, which is a continuation-in-part of application No. 10/078,548, filed on Feb. 14, 2002, now Pat. No. 6,824,907.

(51) Int. Cl.[7] .............................. H01M 8/12; B05D 5/12
(52) U.S. Cl. ........................... 429/31; 429/33; 264/618; 427/155
(58) Field of Search .............................. 429/30, 31, 32, 429/33; 264/618; 427/115

(56) References Cited

U.S. PATENT DOCUMENTS

| 4,454,207 A | 6/1984 | Fraioli et al. | |
|---|---|---|---|
| 4,490,444 A | 12/1984 | Isenberg | |
| 4,567,117 A | 1/1986 | Patel et al. | |
| 4,664,986 A | * | 5/1987 | Draper et al. .................. 429/26 |

(Continued)

FOREIGN PATENT DOCUMENTS

| DE | 3922673 | 1/1991 | ............ H01M/8/12 |
| EP | 0678597 A1 | 10/1995 | ............ C25D/13/02 |
| EP | 0713931 A2 | 5/1996 | ............ H01M/8/12 |
| JP | 10158894 | 6/1998 | ............ H01M/8/02 |
| WO | WO 99/17390 | 4/1999 | ............ H01M/8/12 |
| WO | WO 01/24300 A1 | 4/2001 | ............ H01M/8/10 |
| WO | WO 01/28011 A1 | 4/2001 | ............ H01M/4/62 |
| WO | 2001/86030 A | 11/2001 | |

*Primary Examiner*—Stephen J. Kalafut
(74) *Attorney, Agent, or Firm*—Knobbe, Martens, Olson & Bear LLP

(57) ABSTRACT

This invention relates to a method of manufacturing a metal-supported tubular micro-solid oxide fuel cell, and a fuel cell made from such method. The method comprises the steps of coating a wooden substrate member with a conductive substrate layer, coating the substrate layer with an inner electrode layer, coating the inner electrode layer with an electrolyte layer, drying and sintering the coated substrate member such that the substrate member combusts, coating the electrolyte layer with an outer electrode layer, and then drying and sintering the layers.

27 Claims, 7 Drawing Sheets

U.S. PATENT DOCUMENTS

| | | | |
|---|---|---|---|
| 4,728,584 A | 3/1988 | Isenberg | |
| 4,729,931 A | 3/1988 | Grimble | |
| 4,791,035 A | 12/1988 | Reichner | |
| 5,002,647 A | 3/1991 | Tanabe et al. | |
| 5,077,148 A | 12/1991 | Schora et al. | |
| 5,103,871 A | 4/1992 | Misawa et al. | |
| 5,244,752 A | 9/1993 | Zymboly | |
| 5,273,837 A | 12/1993 | Aitken et al. | |
| 5,302,319 A | 4/1994 | Wright et al. | |
| 5,342,704 A | 8/1994 | Vasilow et al. | |
| 5,380,600 A | 1/1995 | Hansen et al. | |
| 5,458,989 A | 10/1995 | Dodge | |
| 5,518,827 A | 5/1996 | Matsumura et al. | |
| 5,763,114 A | 6/1998 | Khandkar et al. | |
| 5,807,642 A * | 9/1998 | Xue et al. | 429/33 |
| 5,827,620 A | 10/1998 | Kendall | |
| 5,908,713 A | 6/1999 | Ruka et al. | |
| 5,935,727 A | 8/1999 | Chiao | |
| 5,942,348 A | 8/1999 | Jansing et al. | |
| 5,952,116 A | 9/1999 | Blum et al. | |
| 5,976,721 A | 11/1999 | Limaye | |
| 5,993,985 A | 11/1999 | Borglum | |
| 5,993,989 A | 11/1999 | Baozhen et al. | |
| 6,001,501 A | 12/1999 | Collie | |
| 6,007,932 A | 12/1999 | Steyn | |
| 6,017,646 A | 1/2000 | Prasad et al. | |
| 6,051,173 A | 4/2000 | Fasano et al. | |
| 6,051,330 A | 4/2000 | Fasano et al. | |
| 6,074,771 A | 6/2000 | Cubukcu et al. | |
| 6,080,501 A * | 6/2000 | Kelley et al. | 429/31 |
| 6,099,985 A | 8/2000 | Elangovan et al. | |
| 6,183,897 B1 | 2/2001 | Hartvigsen et al. | |
| 6,194,335 B1 * | 2/2001 | Crome et al. | 429/30 X |
| 6,207,311 B1 | 3/2001 | Baozhen et al. | |
| 6,214,490 B1 | 4/2001 | Pate | |
| 6,217,822 B1 | 4/2001 | Borglum | |
| 6,238,819 B1 | 5/2001 | Cahill et al. | |
| 6,312,847 B1 | 11/2001 | Tsukuda et al. | |
| 6,338,913 B1 | 1/2002 | Eshraghi | |
| 6,383,350 B1 * | 5/2002 | Sehlin et al. | 429/30 X |
| 6,399,232 B1 | 6/2002 | Eshraghi | |
| 6,403,248 B1 | 6/2002 | Eshraghi | |
| 6,403,517 B1 | 6/2002 | Eshraghi | |
| 6,605,316 B1 * | 8/2003 | Visco et al. | 427/115 |
| 2002/0028367 A1 * | 3/2002 | Sammes et al. | 429/31 |
| 2002/0048699 A1 | 4/2002 | Steele et al. | 429/30 |
| 2003/0134169 A1 | 7/2003 | Sarkar et al. | |
| 2003/0134170 A1 | 7/2003 | Sarkar et al. | |
| 2003/0134176 A1 | 7/2003 | Sarkar et al. | |

* cited by examiner

METAL-SUPPORTED TUBULAR MICRO-FUEL CELL

RELATED APPLICATIONS

This application is a Continuation-In-Part of and incorporates by reference U.S. application No. 10/156,755 entitled "Solid Oxide Fuel Cell System" filed May 23, 2002 and of U.S. application No. 10/078,548 entitled "Tubular Solid Oxide Fuel Cell Stack" filed on Feb. 14, 2002, now U.S. Pat. No. 6,824,907.

FIELD OF THE INVENTION

This invention relates to fuel cells and in particular to metal-supported tubular solid oxide fuel cells.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically at a minimum of 750° C. and usually in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

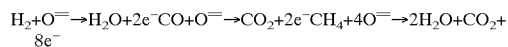

Cathode reaction:

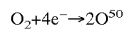

Known SOFC designs include planar and tubular fuel cells. Applicant's own PCT application no. PCT/CA01/00634 discloses a method of producing a tubular fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

As mentioned, solid oxide fuel cells operate at high temperatures. It is known that decreasing the thickness or increasing the conductivity of the electrolyte will enable the fuel cell to operate at lower temperatures. Reducing the overall wall thickness of the fuel cell has additional benefits, including low thermal mass and increasing the thermal shock resistance of the fuel cell, which contributes to reducing fuel cell start up/shut down time. However, when the fuel cell wall thickness is reduced, its mechanical strength is also reduced. Thin-walled tubular SOFCs tend to be relatively fragile and may not even be self-supporting, which limit their usefulness in commercial operation, especially in conditions that require robust fuel cell components.

SUMMARY OF THE INVENTION

According to one aspect of the invention, there is provided a tubular solid oxide fuel cell comprising a tubular, substantially metallic porous support layer; and a tubular, substantially ceramic functional layer assembly in concentric adjacent contact with the support layer. The functional layer comprises in concentric arrangement: an inner electrode layer, a middle electrolyte layer, and an outer electrode layer. The functional layer assembly has a wall thickness less than or equal to 80 $\mu$m. In particular, the functional layer assembly may have a diameter of less than or equal to 5 mm and a wall thickness less than or equal to 65 $\mu$m. More particularly, the functional layer assembly may have a diameter of less than or equal to 2 mm and a wall thickness less than or equal to 20 $\mu$m.

The dimensions of the support layer are selected to enable the support layer to mechanically support the functional layer assembly. In particular, the support layer may have a thickness of between 20 and 500 $\mu$m. The support layer may be made of a material selected from the group of stainless steel, ferritic steel, and super-alloy.

The inner electrode layer may be an anode and have a thickness of between 1 and 20 $\mu$m. The outer electrode layer may be a cathode and have a thickness of between 1 and 30 $\mu$m.

The electrolyte may be made of a material selected from the group of yttria-stabilized zirconia and $Gd_2O_3$-doped $CeO_2$. When made of yttria-stabilized zirconia, the electrolyte may have a thickness less than or equal to 5 $\mu$m. When made of $Gd_2O_3$-doped $CeO_2$, the electrolyte may have a thickness of less than or equal to 15 $\mu$m. The electrolyte may contain a certain percentage (0–30%) of nano-sized (less than or equal to 50 nm) electrolyte powder fraction with submicron electrolyte powder to reduce the sintering temperature of the electrolyte. Alternatively, the electrolyte may contain sintering additives (e.g., in case of $CeO_2$ system CoO or a mixture of CoO and iron oxide, or CoO and copper oxide mixture or a mixture of cobalt and iron, or mixture of cobalt and copper) for lowering the sintering or densification temperature. These sintering mixtures are expected to have a lower melting temperature than a single material sintering additive.

A fuel cell having such dimensions and materials are thin-walled tubular micro-fuel cells that are expected to have better thermal shock resistance and mechanical flexibility than larger-diameter thicker-walled ceramic tubular fuel cells.

The fuel cell described above may be assembled with other fuel cells to form a stack. In particular, the fuel cell stack comprises the fuel cell described above, and a foam-like support matrix embedding the fuel cell and having a porosity sufficient to flow a reactant therethrough and to the outer surface of the embedded fuel cell.

According to another aspect of the invention, there is provided a method of manufacturing a tubular solid oxide fuel cell comprising the following steps:

(a) coating a substrate member with a conductive substrate layer, wherein the material of the substrate member is selected from the group of wood, polymer, paper, and jute/polymer fibers;

(b) coating the substrate layer with an inner electrode layer, (c) coating the inner electrode layer with an electrolyte layer;

(d) drying and sintering the coated substrate member such that the substrate member combusts;

(e) coating the electrolyte layer with an outer electrode layer, and (f) drying and sintering the layers thereby producing a hollow tubular fuel cell.

The material of the conductive substrate layer may be selected from the group of metal, carbon, and graphite. When the conductive substrate layer material is metal, the metal may be selected from the group of stainless steel, ferritic steel and super-alloy. When the substrate layer material is metal, the coated substrate member may be dried and sintered between steps (a) and (b), such that the substrate member combusts, and then the remaining metal substrate layer may be shaped.

Between steps (a) and (b), the conductive substrate layer may be coated with a metal support layer by electrophoretic deposition. The metal support layer may have a thickness between 20 and 500 μm.

According to another aspect of the invention, there is provided a method of manufacturing a tubular solid oxide fuel cell comprising:

(a) coating a tubular substantially metallic support layer with a substantially ceramic inner electrode layer, (b) coating the inner electrode layer with a substantially ceramic electrolyte layer;

(c) drying and sintering the layers (d) coating the electrolyte layer with a substantially ceramic outer electrode layer, then (e) drying and sintering the outer electrode thereby producing a flexible hollow tubular metal-supported fuel cell;

the electrode and electrolyte coatings having a collective wall thickness of 80 μm or less.

The inner electrode layer may be coated on the support layer by one in the group of electrophoretic deposition, dip-coating and spraying. The electrolyte layer may be coated on the inner electrode layer by one in the group of electrophoretic deposition, dipcoating, and spraying. The electrolyte layer may be a sol-gel layer.

DETAILED DESCRIPTION

Figure 1:
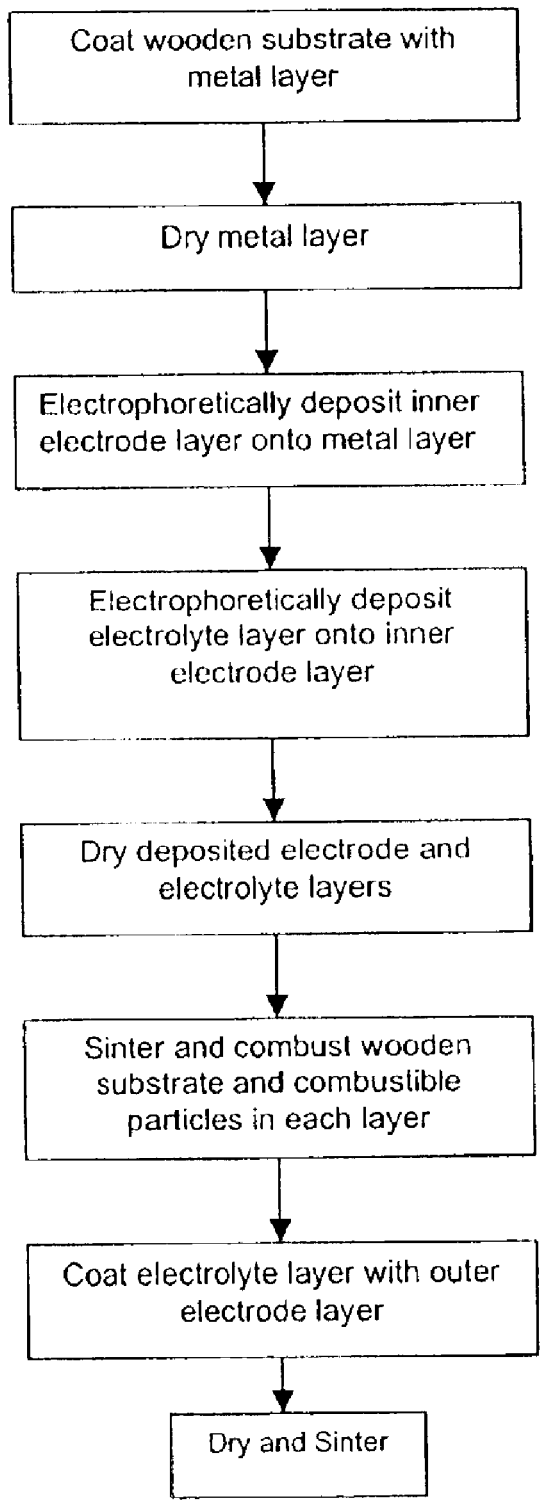
FIG. 1 is a flowchart of the steps in producing a metal-supported tubular SOFC using a wooden rod-like substrate.

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), suicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "porous" in the context of hollow ceramic, metal, and cermet membranes and matrices means that the material contains pores (voids). Therefore, the density of the porous material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

According to one embodiment of the invention, there is provided a method of manufacturing a metal-supported tubular micro-solid oxide fuel cell (μ-SOFC). The SOFC has three functional layers: an inner electrode membrane, a middle electrolyte membrane, and an outer electrode membrane. The electrodes serve as a current collector and a catalyst. The electrolyte allows oxygen ions to pass from one electrode (cathode) to the other (anode), and is impermeable to nitrogen in air and fuel gas flows on either side of the electrolyte. The functional layers are mechanically supported by a tubular metal support layer, which in this embodiment is the inner layer of the fuel cell. However, the metal support layer may be located elsewhere on the fuel cell, e.g. concentric to and outside of the functional layers.

Figure 6:
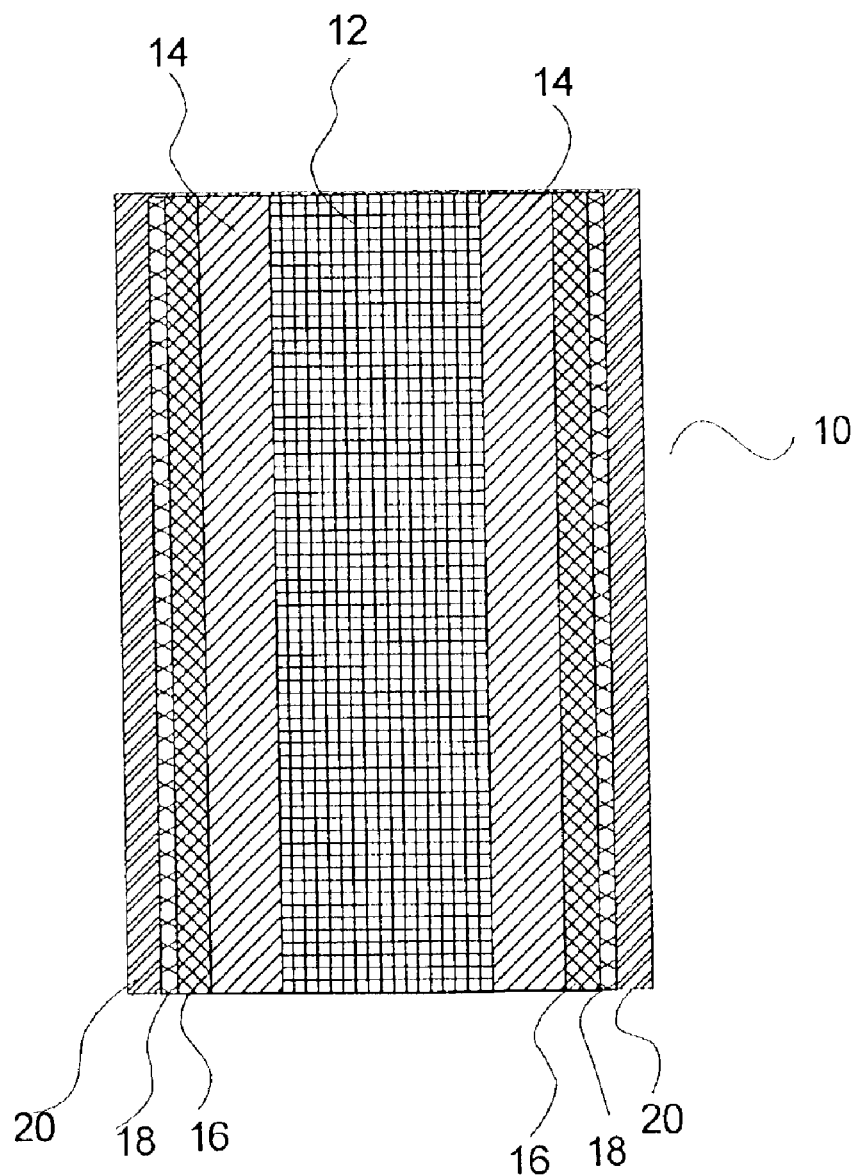
FIG. 6 is a schematic side section view of a fuel cell produced by the method illustrated in FIG. 1.

Referring to FIGS. 1 and 6, a fuel cell 10 is produced by coating successive fuel cell layers onto a wooden substrate 12. The substrate 12 serves as a template for the fuel cell 10 and thus has dimensions and geometry selected to correspond to the fuel cell to be produced. In this described embodiment, the wooden substrate 12 is an elongate circular-cross section rod for producing tubular SOFC, and has a diameter in the range of 0.1 to 10 mm. The substrate 12 is particularly suitable for producing tubular micro-fuel cells having a diameter of less than or equal to 5 mm. Wood is selected for its low cost and its combustibility at sintering temperatures. However, other materials with similar properties, such as polymer, paper, or jute/polymer fibers, may be used for the substrate 12.

The wooden substrate 12 is first coated with a conductive substantially metallic layer 14. A suitable method of coating the metallic layer 14 is by dip-coating (or spray coating or brush painting) the wooden substrate 12 in a container of liquid metal mixture, as is known in the art. The mixture includes combustible additives that combust during sintering to make the metallic layer 14 porous. The metal of the metallic layer 14 is any conductive metal that is able to withstand typical SOFC operating conditions. Suitable metals include nickel, copper, silver, silver alloys (silver nickel alloy), stainless steel, ferritic steel, and super alloy (e.g. Inconel). Generally, the thickness of the metallic layer 14 is selected to enable the metallic layer 14 to provide mechanical support for a thin-walled tubular $\mu$-SOFC in a stack subjected to typical SOFC operating conditions. In particular, the metallic layer 14 has a thickness in the order of 20–500 $\mu$m and preferably around 200 $\mu$m.

After the wooden (or polymer or paper or jute/polymer fibers) substrate 12 is coated with the metallic layer 14, the metallic layer 14 is allowed to dry. Then, functional layers are successively applied to produce a fuel cell 10 having multiple concentric layers of material. "Functional" layer means the electrodes and the electrolyte of the fuel cell 10, and in particular excludes the metallic layer 14, which is hereinafter referred to as the "support layer" of the fuel cell 10.

The first functional layer applied is the inner electrode layer 16, and this layer is applied onto the support layer 14 by electrophoretic deposition (EPD) or another comparable process as known in the art. In this connection, the support layer 14 serves as a conductive surface which enables the inner electrode layer 16 to be applied by EPD. The process of coating by EPD has been previously described in Applicant's published PCT application no. PCT/CA01/00634. The inner electrode layer 16 may serve as the anode of the fuel cell 10, and as such, is made of a nickel (or copper) and zirconia (or ceria) cermet having a thickness of between 1 $\mu$m to 20 $\mu$m and preferably about 5 $\mu$m. Prior to the EPD, the anode material is in the form of a slurry; the slurry includes combustible particles that create a porous anode structure when sintered (described below in greater detail). The concentration and distribution of the combustible particles in the inner electrode layer 16 are selected to provide the inner electrode layer 16 with a porosity greater than or equal to 15 vol. %, and preferably around 30 vol. %.

After the inner electrode layer 16 has been applied, the electrolyte layer 18 is applied onto the inner electrode layer 16. In order to reduce the operating temperature of the fuel cell 10, and in particular to lower the operating temperature to or below 700° C., a high conductivity electrolyte material is selected, such as $Gd_2O_3$ doped-$CeO_2$. An electrolyte having such material may be applied onto the anode layer by EPD to a thickness of 15 $\mu$m or less. Alternatively, a lower fuel cell operating temperature may be achieved without the use of a high conductivity electrolyte, by reducing the thickness of the electrolyte layer 18. In such case, an electrolyte layer 18 made of yttria-stablized zirconia (YSZ) having a thickness of less than or equal to 5 $\mu$m, and preferably around 2 $\mu$m may be used to produce a fuel cell 10 that is operable at around 700° C. or less. To apply such a thin layer of electrolyte, a sol-gel technique is used as is known in the art.

After the anode and electrolyte layers 16, 18 have been applied, they are allowed to dry. Then, the wooden substrate 12 and coated layers 16, 18 are sintered at a temperature sufficient to burn out the combustible wooden substrate 12 as well as any combustible additives in the coatings 16, 18. The sintering also enables the electrolyte layer 18 to achieve full density while maintaining the porosity of the inner electrode layer 16. The sintering cycle for a zirconia deposit where the sintering atmosphere is air or non-oxidizing may begin by raising the temperature to about 500° C. to about 800° C. at a heating rate of between 20° C./hr to 300° C./hr and preferably over a period of about 6 hours to about 9 hours and held at that temperature for about 3 hours. The temperature may then be raised at a rate of about 100° C. to about 300° C. per hour to the sintering temperature of about 900° C. to about 1400° C. and held there for about 0.5 to about 5 hours. The temperature may then be lowered at a rate of about 100° C. to about 300° C. per hour to room temperature.

After sintering, the electrolyte layer 18 is coated with an outer electrode layer 20. As the inner electrode layer 16 in this embodiment is the anode, the outer electrode layer 20 serves as the cathode and as such its composition may suitably be LSM, or a LSM/zirconia mixture, or another electrically and ionically conductive ceramic material. The outer electrode layer 20 may be applied to the electrolyte layer 18 by any suitable known means, including but not restricted to EPD, dip-coating, brushing, spraying or sol-gel coating. The coating thickness is between 1 and 30 $\mu$m and preferably around 10 $\mu$m. Like the anode layer 16, combustible particles are added to the cathode slurry that are combusted during sintering to produce a porous cathode layer 20.

After the outer electrode layer 20 has been applied to the electrolyte layer 18, the fuel cell 10 is subjected to a drying stage wherein heat is applied at increasing temperatures of 40° C., 60° C., 80° C., 100° C., 120° C., and 140° C. The outer electrode layer 20 may be heated at each temperature for a period between 10 minutes to 5 hours. Then, a final sintering stage is applied to partially densify the outer electrode layer 20, to bond the outer electrode layer 20 to the electrolyte layer 18, and to combust any combustible particles in the outer electrode material. The sintering cycle where the sintering atmosphere is air may begin by raising the temperature from room temperature to a first temperature of about 200–250° C., then to a second temperature between about 400–600° C., then to a third temperature between about 800–900° C., then finally to a temperature of between 800 to 1100° C. The heating rate for each of these sintering steps is between about 20–300° C./hr. The outer electrode layer 20 is held at each of these temperatures for between about 15 minutes to 5 hours. The temperature may then be lowered at a rate of about 60–300° C. per hour to room temperature.

The fuel cell 10 that is produced as a result of these steps is a hollow elongate tubular structure. The cross-section of this tubular structure is generally circular, but it is within the scope of the invention for the cross-section to have other shapes, such as square, hexagonal etc. The fuel cell 10 has multiple concentric layers of material, namely, the inner metal support layer 14, and a substantially ceramic functional layer assembly in concentric adjacent contact with the support layer; the functional layer assembly comprises the inner electrode layer 16, the middle electrolyte layer 18, and the outer electrode layer 20. The functional layer assembly is extremely thin compared to state of the art tubular fuel cells, generally having a wall thickness less than or equal to 80 $\mu$m and in particular, in the order of around 25 $\mu$m, and as such gives the fuel cell 10 extremely high thermal shock resistance, very rapid start up time (i.e. time to heat up to operating temperature), and a degree of elasticity that gives the fuel cell 10 better mechanical shock resistance than thicker-walled ceramic fuel cells. This last characteristic is particularly important where the fuel cell 10 is to be used in adverse conditions where the components of a fuel cell system may be subjected to vibration and other mechanical shocks. A major problem with anode supported NiO(Ni)-zirconia substrate is the dimension change associated with the oxidation and reduction of NiO/Ni. Oxidation of Ni of a cell results volume expansion on the anode substrate and introduce tension on the electrolyte layer and as a result micro-cracking occurs in the electrolyte layer. Particularly this is a critical during cooling of a SOFC from its operating temperature; any air leak can essentially damage the electrolyte of the cell. Since present design replaces an anode-supported fuel cell by a metal-supported SOFC, therefore, it avoids the problem associated with oxidation-reduction. Furthermore, the metal support layer 14 of the fuel cell 10 can be welded to other parts of a fuel cell system, thereby giving further design options when designing a fuel cell system.

Figures 7A, 7B:
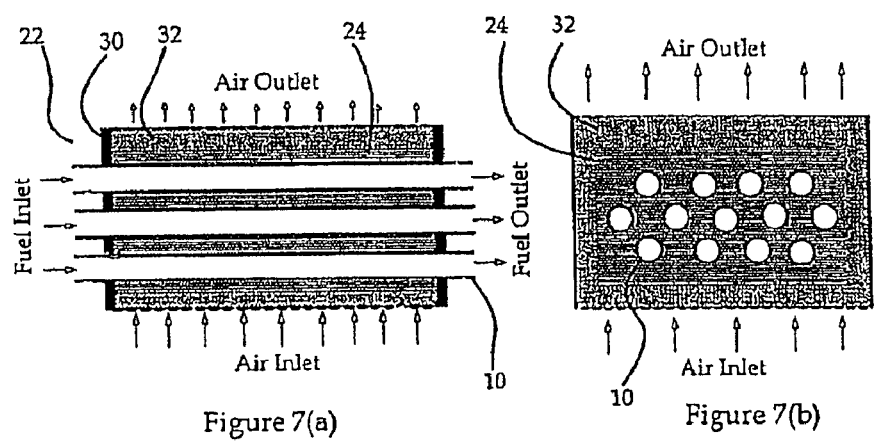
FIGS. 7(a) and (b) are schematic plan and end views of a fuel cell stack having a plurality of the fuel cells of FIG. 6.

Referring to FIGS. 7(*a*) and 7(*b*), the fuel cell 10 may be assembled with other like fuel cells 10 in a stack 22 by arranging the fuel cells 10 in a longitudinally extending tightly packed array and embedding the fuel cells 10 in a foam-like solid-state support matrix 24. The support matrix 24 is made from ceramic or another material that is able to withstand typical SOFC operating temperatures, e.g. steel or a superalloy. The support matrix 24 may be made of LSM to enable it to operate at up to around 1000. degree. C. and to serve to collect current, to ionize oxygen into oxide ions, and to conduct these ions to the electrolyte. The support matrix 24 fills the spaces between the fuel cells 10 and contacts the outer surface of each fuel cell 10, i.e. the cathode layer of each fuel cell 10. Because the support matrix 24 is of the same material as the cathode layer, the support matrix 24 serves to increase the effective surface area of the cathode, thereby increasing the area for collecting electrons, and ionizing oxygen.

Instead of LSM, the support matrix 24 may alternatively be made of any suitable electronic or mixed (electronic and ionic) conductive porous solid state material. When made from an electronic conductive material (e.g. metal), the support matrix 24 can carry electricity by electron transportation. When made from a mixed conductor material (e.g. LSM or metal/ceramic composite), the support matrix 24 can carry electricity by electron and ion transportation. When made from an ionic conductor material (e.g. Yittria-doped zirconia), the support matrix 24 can carry electricity by ion transportation.

When the support matrix 24 is made entirely of steel or a superalloy, it serves to provide mechanical support to hold the single cells together, as well as to serve as a current collector. If the support matrix 24 is made of a steel or a superalloy coated with a catalyst, it serves to provide mechanical support, collect current, and promote chemical reactions, such as ionization. If the support matrix 24 is made of a steel or a superalloy coated with catalyst and an ionic or mixed conductor, it serves to provide mechanical support, collect current, promote chemical reactions, and provide an ionic conduction path.

The support matrix 24 is porous (with channel-type connected pores) to allow the flow through of oxidant through the stack 22, and to the cathode layer 16 of each fuel cell 10. The porosity of the support matrix 24 is selected to provide a sufficient oxidant flow-through rate and sufficient mechanical strength to serve as a support structure for the fuel cell stack 22. In this connection, the support matrix 24 has a porosity of between 40–95% and preferably about 70%.

The stack 22 may be capped at each longitudinal end by respective end plates 30; each end plates is provided with a plurality of openings corresponding to the tubular fuel cells 10, such that the fuel cells extend through the end plates 30. The body of the stack is wrapped by a perforated cover 32 that is permeable to air. In operation, the stack 22 can be assembled in a fuel cell system (not shown) that flows air to one side of the stack, through the cover 32, through the porous support matrix 24 and to the outer surface of each fuel cell. Unused air and reaction products are carried out of the stack through the cover 32 on opposite side of the stack 22.

The pumps, controllers, and other ancillary equipment of a fuel cell system are known in the art and are not described here. Also, the fuel cell stack 22 is electrically connected to an external circuit (not shown) as is known in the art.

There are different processes to embed fuel cells 10 in the porous matrix. According to one process, an apparatus (not shown) is provided for immersing a plurality of fuel cells 10 in a slurry of matrix material. The apparatus comprises a pair of end plates made of a ceramic, superalloy or another material capable of withstanding sintering, a combustible flexible sheet, and means for supplying the slurry to the apparatus. The end plates each have a plurality of indentations on one of their major faces; the indentations are shaped and sized to accept the ends of fuel cells 10. The flexible sheet may be made of paper board or a suitable plastic material. Upon sintering (described below), the flexible sheet burns away. Alternatively, the flexible sheet may be replaced by a non-combustible container wall (not shown) of ceramic such as alumina or zirconia, or metal. Such container serves to contain the slurry during heat treatment/sintering, but can also serve as an integral component of the fuel cell stack 22.

Each end of each fuel cell 10 is taped with a protective masking tape (not shown) or a suitable combustible coating to keep the ends free from the slurry. Then, each end plate is clamped to each end of each fuel cell 10, holding each fuel cell in place. Then, the flexible sheet is wrapped around the fuel cells 10; the sheet is large enough to wrap completely around the fuel cells 10 and to attach to each end plate. When wrapped, the sheet and end plates form a cylindrical container that encloses the fuel cells 10. A slurry injection port is provided in one of the base plates.

The slurry is a suspension of the matrix material, water or organic solvent, a dispersant, a foaming agent, organic monomers and an initiator. The matrix material in this case is LSM (lanthanum strontium manganate), but can be any ceramic and/or metal powder having suitable properties, such as $LaCr(Mg)O_3$, doped $LaCrO_3$ ($La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xCO_{1-y}F_{cy}O_3$, stainless steel (316, 316L), cermet (such as Ni-Yittria stabilized zirconia or any Ni and doped zirconia cermet, Ni doped-$CeO_2$ cermet, Cu doped-ceria cermet), silver and its alloys, Inconel steel or any superalloy, or ferritic steel SiC, $MoSi_2$. The organic monomers may be mehty methacrylate, butyl arcylate, acrylamide, or other acrylates. The dispersant may be polyacrylic acid. The foaming agents may be Tergiton TMN10 or Triton X114. The initiator may be ammonium persulphate (APS). The slurry upon heat treatment will produce a foam that has a porous structure wherein the majority of the pores are interconnected to provide continuous fluid pathways. Upon sintering, this foam becomes the solid-state porous support matrix 24 with a foam-like microstructure.

Instead of or in addition to the foaming agent, combustible additives may be added to the slurry, such as polymer powder, organic powder, saw dust and fibres. Upon sintering at a temperature hot enough to combust the combustible additives, the additives burn away, leaving behind the solid-state support matrix 24 with a foam-like porous microstructure.

Instead of or in addition to the foaming agent and combustible additives, a porous foam-like microstructure can be formed by using hollow ceramic particles. Spherical ceramic particles such as commercially available alumina bubbles ($Al_2O_3$) are first coated with matrix material, e.g. by dipping or spraying the particles with the slurry, or by electroless coating of matrix material onto the particles. Then, the coated particles are placed in a container having a plurality of tubular fuel cells 10 arranged in the desired stack configuration. The container is packed with the particles such that tubular fuel cells 10 are held securely in place. Then, a lid is placed on the container, and the filled container is subjected to a sintering process whereby the coating will bond with the particles thereby physically interconnecting the particles.

The slurry is injected or poured through the slurry port until the container is filled and the fuel cells 10 are immersed with slurry. The slurry is left to completely dry at ambient temperature (or at an elevated temperature up to about 120° C.).

After the slurry has dried, the container and its contents are sintered. The sintering cycle involves first increasing the temperature from ambient to 200° C. for and holding at that temperature 1–10 hours, then increasing the temperature to 500° C. and holding at that temperature for 1–10 hours, then increasing the temperature to 650° C. and holding at that temperature for 1–10 hours, then increasing the temperature to 800° C. and holding at that temperature for 1–10 hours, then finally increasing the temperature to 850–1100° C. and holding at that temperature for 5 hours. The rate of temperature increase in each step is between 20–300° C. The temperature is then allowed to drop to ambient temperature at a rate of between 60–300° C.

During sintering, the combustible flexible sheet is burned away, leaving behind a fuel cell stack 22 having the fuel cells 10 embedded in the solidified porous support matrix 24 such that the matrix 24 surrounds the length of each embedded fuel cell 10 (because the ends of the fuel cells 10 are masked prior to coating with slurry, they are free of the matrix 24). The end plates are then removed, and the stack 22 is ready for combining with other components to produce a fuel cell system.

Figure 2:
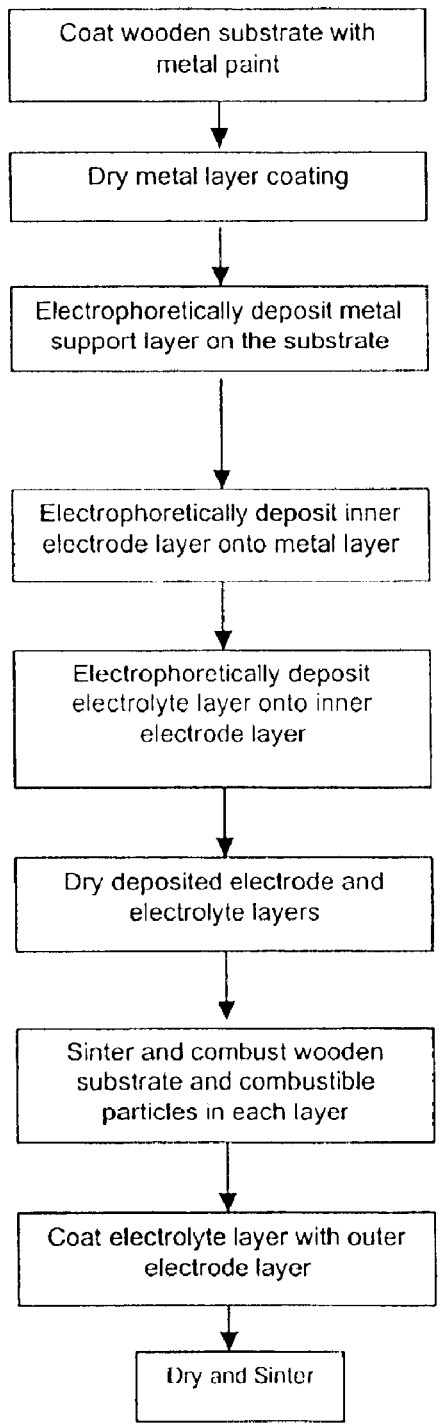
FIG. 2 is a flowchart of the steps in producing a metal-supported tubular SOFC using a wooden rod-like substrate that is coated first with a first metal layer by painting, then by a second metal layer by electrophoretic deposition.

According to another embodiment of the invention and referring to FIG. 2, a metal supported tubular SOFC is produced in a manner similar to the method described in the first embodiment, except that prior to applying the first functional layer, the wooden (or polymer or paper or jute/polymer fibers) substrate 12 is first coated with a thin layer of metal paint (thinner than the metal support layer in the first embodiment), then another metallic layer 14 is applied over the metal paint by EPD. The total thickness of the two-layered metal support coating is in the range of 20 to 500 µm. In general, coating by EPD offers a better surface interface finishing and better microstructural homogeneity than comparable methods of metal layer coating.

Figure 3:
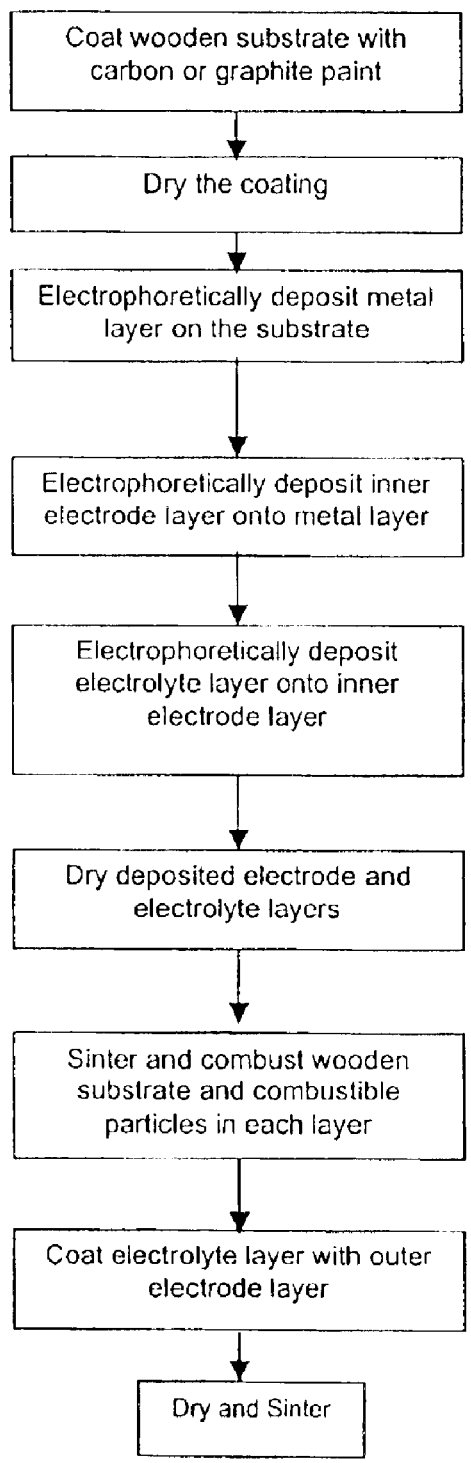
FIG. 3 is a flowchart of the steps in producing a metal-supported tubular SOFC using a wooden rod-like substrate coated with a carbon or graphite layer.

According to another embodiment of the invention and referring to FIG. 3, a metal supported tubular SOFC is produced in a manner similar to the method described in the first embodiment, except that prior to applying the first functional layer, the wooden (or polymer or paper or jute/polymer fibers) substrate 12 is first coated with a layer carbon or graphite paint, then coated with a metal support layer by EPD. The carbon or graphite layer makes the wooden (or polymer or paper or jute/polymer fibers) substrate 12 conductive, thereby enabling the metallic layer 14 to be applied thereon by EPD. The carbon or graphite layer will be combusted along with the wooden core during sintering.

Figure 4:
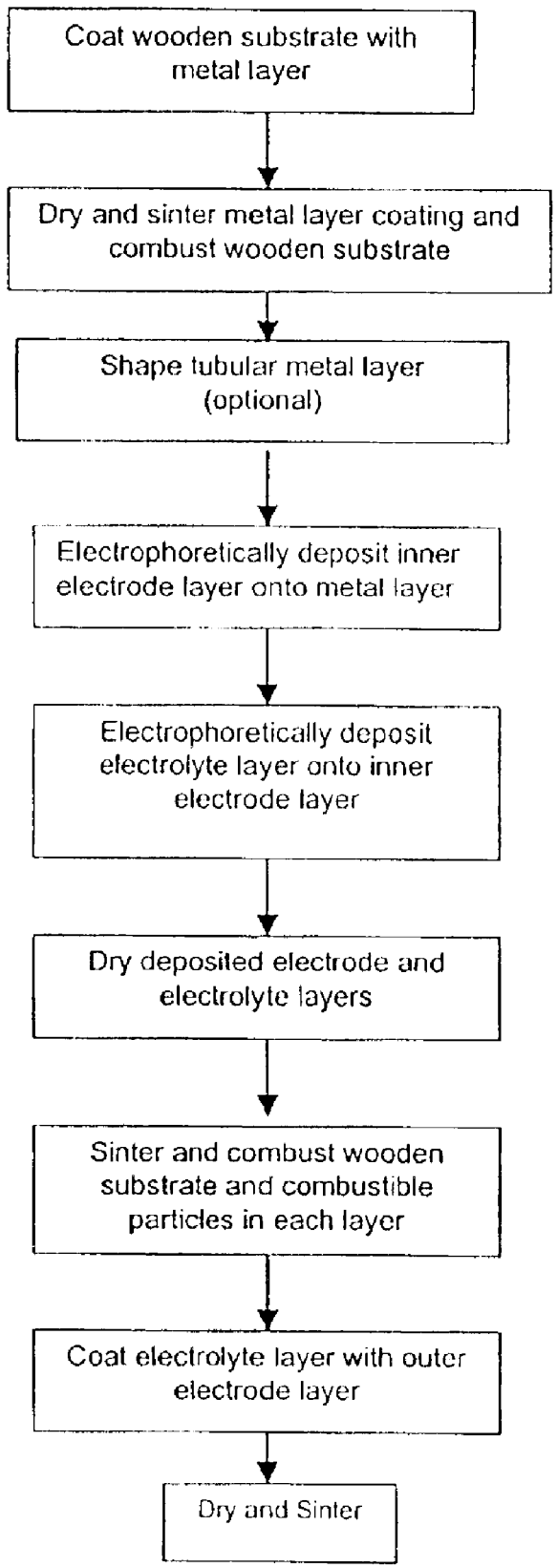
FIG. 4 is a flowchart of the steps in producing a metal-supported tubular SOFC that includes shaping the fuel cell into a non-elongate configuration.

According to another embodiment of the invention and referring to FIG. 4, a metal supported tubular SOFC is produced in a manner similar to the method described in the first embodiment, except that after the metallic layer 14 applied to the wooden (or polymer or paper or jute/polymer fibers) substrate 12 has dried and before the first functional layer is applied, the metal coated wooden (or polymer or paper or jute/polymer fibers) substrate 12 is sintered. This burns away the wooden (or polymer or paper or jute/polymer fibers) substrate 12, leaving behind a thin tubular metallic layer 14, that can be shaped into different fuel cell configurations, e.g. "U" shaped, or coil shaped. After such shaping, the functional layers are applied to the metallic layer 14 as described above.

Figure 5:
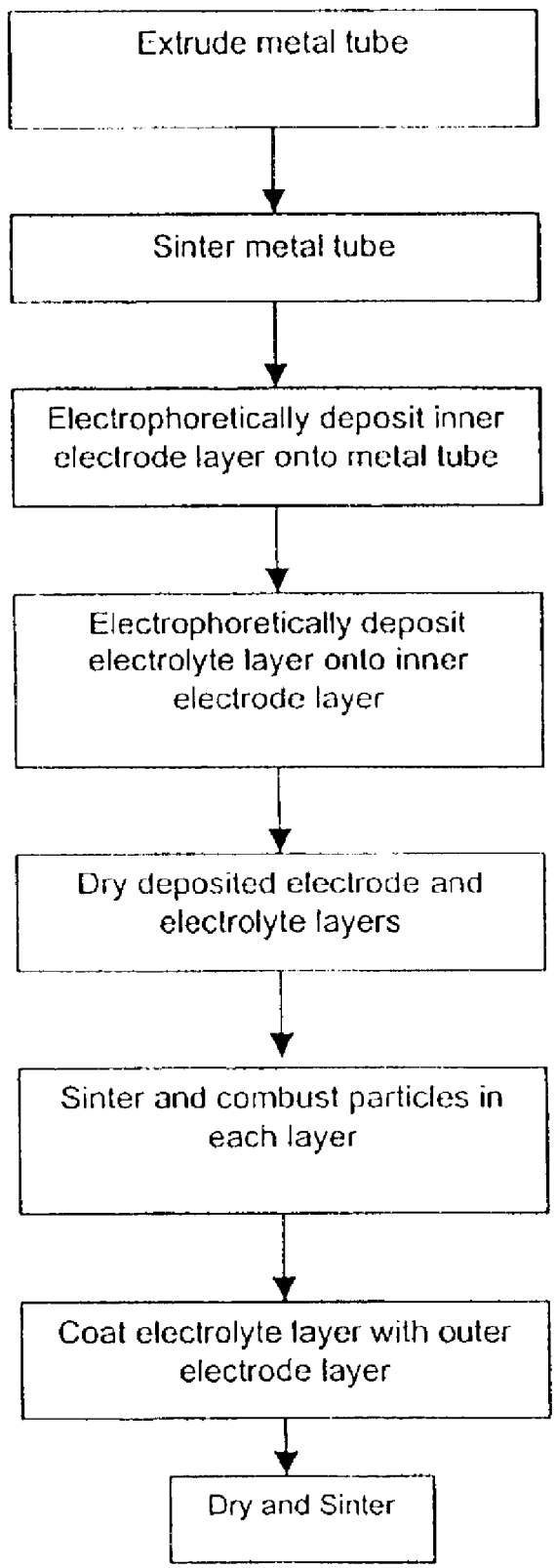
FIG. 5 is a flowchart of the steps in producing a metal-supported tubular SOFC using an extruded metal tube as a support layer of the fuel cell.

According to another embodiment of the invention and referring to FIG. 5, a metal supported tubular SOFC is produced in a manner similar to the method described in the first embodiment, except that the wooden metal-coated rod-like substrate 12 is replaced by a hollow tubular extruded tube (not shown). The metal tube is preferably in the order of about 1 mm in diameter with a wall thickness less than 500 µm and preferably in the order of about 200 µm, but these dimensions can be scaled up or down depending on the desired size of the fuel cell 10. The tube is extruded from a mixture that contains combustible additives in a concentration and distribution that produces a tube having a porosity in the order of greater than or equal to 30 vol. % and preferably around 60 vol %. The tube is sintered to combust the additives, and produce a porous metal tube. Now the tube may be shaped into a desired fuel cell configuration. Then, the inner electrode layer 16 and electrolyte layer 18 may be applied by EPD according to the steps as described above. The rest of the steps are same as that described in the first embodiment.

While the preferred embodiment of the invention has been illustrated and described, it will be appreciated that various changes can be made therein without departing from the scope and spirit of the invention.

What is claimed is:

1. A tubular solid oxide fuel cell comprising:
   (a) a tubular, substantially metallic porous support layer; and
   (b) a tubular, substantially ceramic functional layer assembly in concentric adjacent contact with the support layer, having a thickness less than or equal to 80 .mu.m and comprising in concentric arrangement: an inner electrode layer, a middle electrolyte layer, and an outer electrode layer; the dimensions of the support layer being selected to enable the support layer to mechanically support the functional layer assembly.

2. The fuel cell of claim 1 wherein the functional layer assembly wall thickness is less than or equal to 65 .mu.m and the diameter less than or equal to 5 mm.

3. The fuel cell of claim 2 wherein the diameter of the functional layer assembly is less than or equal to 2 mm.

4. The fuel cell of claim 2 wherein the thickness of the functional layer assembly is less than or equal to 20 .mu.m.

5. The fuel cell of claim 1 wherein the electrolyte is made of a material selected from the group of yittria-stabilized zirconia and $Gd_2O_3$doped $CeO_2$.

6. The fuel cell of claim 5 wherein the electrolyte is made of yittria-stabilized zirconia and has a thickness less than or equal to 5 .mu.m.

7. The fuel cell of claim 5 wherein the electrolyte is made of $Gd_2O_3$-doped $CeO_2$ and has a thickness of less than or equal to 15 .mu.m.

8. The fuel cell of claim 5 wherein the electrolyte includes a sintering additive selected from the group of CoO and iron oxide, Co and copper oxide, cobalt and iron, and cobalt and copper.

9. The fuel cell of claim 1 wherein the support layer has a thickness of between 20 and 500 .mu.m.

10. The fuel cell of claim 9 wherein the support layer is made of a material selected from the group of stainless steel, ferritic steel, silver nickel alloy and super-alloy.

11. The fuel cell of claim 1 wherein the inner electrode layer is an anode and has a thickness of between 1 and 20 .mu.m.

12. The fuel cell of claim 1 wherein the outer electrode layer is a cathode and has a thickness of between 1 and 30 .mu.m.

13. A fuel cell stack comprising (a) at least one fuel cell of claim 1; and (b) a foam-like support matrix embedding the fuel cell and having a porosity sufficient to flow a reactant therethrough and to the outer surface of the embedded fuel cell.

14. A tubular solid oxide fuel cell comprising: (a) a tubular, substantially metallic porous support layer made of a material selected from the group of stainless steel, ferritic steel, and super-alloy and having a thickness of between 20 and 500 .mu.m; and (b) a tubular, substantially ceramic functional layer assembly in concentric adjacent contact with the support layer and having a thickness that is less than or equal to 65 .mu.m and comprising in concentric arrangement: an inner electrode layer, a middle electrolyte layer made of a material selected from the group of yittria-stabilized zirconia and $Gd_2O_3$-doped $CeO_2$ and an outer electrode assembly.

15. The fuel cell of claim 14 wherein the thickness of the electrolyte layer is selected such that the fuel cell is flexible and is operable at a temperature less than or equal to 700 .degree. C.

16. The fuel cell of claim 15 wherein the electrolyte layer is made of yittria-stabilized zirconia and the electrolyte layer has a thickness less than or equal to 5 .mu.m.

17. The fuel cell of claim 15 wherein the electrolyte layer is made of $Gd_2O_3$-doped $CeO_2$ and the electrolyte layer has a thickness less than or equal to 15 .mu.m.

18. A method of manufacturing a tubular solid oxide fuel cell comprising (a) coating a substrate member with a conductive substrate layer, the material of the substrate member being selected from the group of wood, polymer, paper and jute/polymer fibers; (b) coating the substrate layer with an inner electrode layer, (c) coating the inner electrode layer with an electrolyte layer; (d) sintering the coated substrate member such that the substrate member combusts; (e) coating the electrolyte layer with an outer electrode layer, and (f) sintering the layers thereby producing a hollow tubular fuel cell.

19. The method of claim 18 wherein the material of the conductive substrate layer is selected from the group of metal, carbon, and graphite.

20. The method of clam 19 wherein the material of the conductive substrate layer is metal selected from the group of stainless steel, ferritic steel and super-alloy.

21. The method of claim 18 wherein between steps (a) and (b), the conductive substrate layer is coated with a metal support layer by electrophoretic deposition.

22. The method of claim 21 wherein the metal support layer has a thickness between 20 and 500 .mu.m.

23. The method of claim 18 wherein the substrate layer material is metal, and between steps (a) and (b), the coated substrate member is sintered such that the substrate member combusts, then the remaining metal substrate layer is shaped.

24. A method of manufacturing a tubular solid oxide fuel cell comprising: (a) coating a tubular substantially metallic support layer with a substantially ceramic inner electrode layer, (b) coating the inner electrode layer with a substantially ceramic electrolyte layer; (c) sintering the layers (d) coating the electrolyte layer with a substantially ceramic outer electrode layer, then (e) sintering the outer electrode thereby producing a flexible hollow tubular metal-supported fuel cell; the electrode and electrolyte coatings having a collective wall thickness of 80 .mu.m or less.

25. The method of claim 24 wherein the inner electrode layer is coated on the support layer by one in the group of electrophoretic deposition and dip-coating.

26. The method of claim 24 wherein the electrolyte layer is coated on the inner electrode layer by one in the group of electrophoretic deposition, dip-coating, and spraying.

27. The method of claim 24 wherein the electrolyte layer is a sol-gel layer.

\* \* \* \* \*

UNITED STATES PATENT AND TRADEMARK OFFICE
CERTIFICATE OF CORRECTION

PATENT NO. : 6,893,762 B2  Page 1 of 1
APPLICATION NO. : 10/207668
DATED : May 17, 2005
INVENTOR(S) : Partho Sarkar et al.

It is certified that error appears in the above-identified patent and that said Letters Patent is hereby corrected as shown below:

| COLUMN | LINE | |
|---|---|---|
| 10 | 58 | In Claim 1, delete ".mu.m" and insert --µm--, therefor. |
| 10 | 64 | In Claim 2, delete ".mu.m" and insert --µm--, therefor. |
| 11 | 2 | In Claim 4, delete ".mu.m" and insert --µm--, therefor. |
| 11 | 8 | In Claim 6, delete ".mu.m" and insert --µm--, therefor. |
| 11 | 11 | In Claim 7, delete ".mu.m" and insert --µm--, therefor. |
| 11 | 17 | In Claim 7, delete ".mu.m" and insert --µm--, therefor. |
| 11 | 23 | In Claim 11, delete ".mu.m" and insert --µm--, therefor. |
| 11 | 26 | In Claim 12, delete ".mu.m" and insert --µm--, therefor. |
| 11 | 36 | In Claim 14, delete ".mu.m" and insert --µm--, therefor. |
| 11 | 39 | In Claim 14, delete ".mu.m" and insert --µm--, therefor. |
| 11 | 42 | In Claim 14, insert --,-- before "and". |
| 11 | 46-47 | In Claim 15, delete "700 .degree.C." and insert -- 700°C. --, therefor. |
| 11 | 50 | In Claim 16, delete ".mu.m" and insert --µm--, therefor. |
| 12 | 3 | In Claim 17, delete ".mu.m" and insert --µm--, therefor. |
| 12 | 25 | In Claim 22, delete ".mu.m" and insert --µm--, therefor. |
| 12 | 40 | In Claim 24, delete ".mu.m" and insert --µm--, therefor. |

Signed and Sealed this

Twenty-fifth Day of July, 2006

JON W. DUDAS
*Director of the United States Patent and Trademark Office*